United States Patent [19]

Seyler

[11] Patent Number: 4,776,626

[45] Date of Patent: Oct. 11, 1988

[54] TRUNK LID HINGE AND SPRING ASSEMBLY

[75] Inventor: Peter G. Seyler, Franklin Park, Ill.

[73] Assignee: Perfection Spring & Stamping Corp., Mt. Prospect, Ill.

[21] Appl. No.: 75,408

[22] Filed: Jul. 20, 1987

[51] Int. Cl.⁴ .............................................. B62D 25/10

[52] U.S. Cl. ........................................ 296/76; 16/289; 49/386

[58] Field of Search ................. 296/76, 57 A, 56, 106; 16/289, 303; 49/379, 386; 180/69.21

[56] References Cited

U.S. PATENT DOCUMENTS

| | | | |
|---|---|---|---|
| 2,259,970 | 10/1941 | Benzick | 49/386 X |
| 2,800,361 | 7/1957 | Kubacka | 296/76 |
| 2,880,453 | 4/1959 | Gessler | 16/289 |
| 2,894,278 | 7/1959 | Gessler | 16/289 |
| 3,195,172 | 7/1965 | Gionet | 296/76 X |
| 3,330,593 | 7/1967 | Pollak | 296/76 |
| 4,452,015 | 6/1984 | Jacques et al. | 49/386 |

*Primary Examiner*—Robert R. Song
*Assistant Examiner*—John Gruber
*Attorney, Agent, or Firm*—Tilton, Fallon, Lungmus

[57] ABSTRACT

A relatively uncomplicated hinge and spring assembly for effectively counterbalancing the trunk lid of an automotive vehicle and for partially opening that lid when it is unlatched. The assembly utilizes an adjustable tension coil spring that exerts a diminishing lifting force as the lid is raised and that, at the manufacturer's/user's option, is used to counterbalance or slightly exceed the gradually diminishing unsupported weight of the lid as it moves from lowered to raised position. The lifting force is augmented over a limited arc of the lid's travel, by lateral deflection or distortion of the spring, to urge the lid into its partially-raised position when it is unlatched.

16 Claims, 4 Drawing Sheets

TRUNK LID HINGE AND SPRING ASSEMBLY

BACKGROUND AND SUMMARY

In an effort to provide counterbalancing mechanisms that exert just enough force to offset the unsupported and gradually-diminishing weight of an automotive trunk lid as such a lid is shifted from a lowered position to a fully raised position, manufacturers have developed relatively complex multi-link hinge and spring assemblies. Such complexities have been further increased in those constructions where remote unlatching of such a lid is desired and where the lid is to pop open a short distance when the remote control is actuated. These complexities have led to undesirably high manufacturer and user costs, objectional bulk and weight and, at least in some instances, increased possibilities of malfunctioning and the need for later repair, adjustment, or replacement. In those cases where an aftermarket modification of a vehicle is desired that would effectively increase the weight of a trunk lid, such as the addition of a luggage rack or a rear spoiler, adjustment or replacement of the counterbalancing mechanism to offset the increase in trunk weight may be difficult, expensive, and possibly dangerous.

Some manufacturers, in an effort to reduce the complexities and costs of providing lids with a pop-open feature, have taken advantage of the recovery forces exerted by the resilient weather strip(s) extending about the edges of a trunk lid or trunk opening; however, such an arrangement is not always effective (the extent of lid opening may vary with age of the sealing strip, with ambient temperature, or with lid size and weight) and may not in any case open the lid sufficiently to suit the need and convenience of users.

An important aspect of this invention therefore lies in the discovery that a highly effective counterbalancing and lifting mechanism may be achieved without the provision of multiple linkages and complex mechanisms. Only a single tension coil spring is used for each hinge assembly. The diminishing unsupported weight of a trunk lid, as that lid is shifted from a lowered to a fully raised position, may be closely matched by the diminishing return force exerted by a tension coil spring, so that a pair of hinge and spring assemblies mounted on opposite sides of a vehicle body within the trunk compartment may effectively counterbalance the weight of a trunk lid at any selected open position. Ideally, the spring mountings are adjustable so that at the option of the manufacturer or user the spring assemblies may exert a lifting force that is just sufficient to hold the lid at any selected open position or, alternatively, is slightly greater than the force required to counterbalance the lid so that the lid, once unlatched, opens gradually into a fully raised position. Friction-operating means are provided by the hinges to hold the lid in an open position until a force of a selected magnitude (preferably 5 to 10 pounds) is exerted to cause downward movement of the lid.

A further aspect of this invention lies in the discovery that the lifting force of a tension coil spring may be augmented or increased at the lower limits of travel of the lid by deflecting or distorting the spring laterally as the lid approaches and reaches its fully closed position. Such deflection and the increased spring tension resulting from it overcompensate for the unsupported weight of the lid so that when the lid is unlatched the spring force will cause it to pop open a limited extent until the spring assumes a linear or undeflected condition. A single spring for each assembly therefore performs dual functions of counterbalancing the weight of the lid and also causing the lid to partially open when unlatched.

Other features, objects, and advantages of the invention will become apparent from the specification and drawings.

DRAWINGS

DETAILED DESCRIPTION OF PREFERRED EMBODIMENTS

Figure 1:
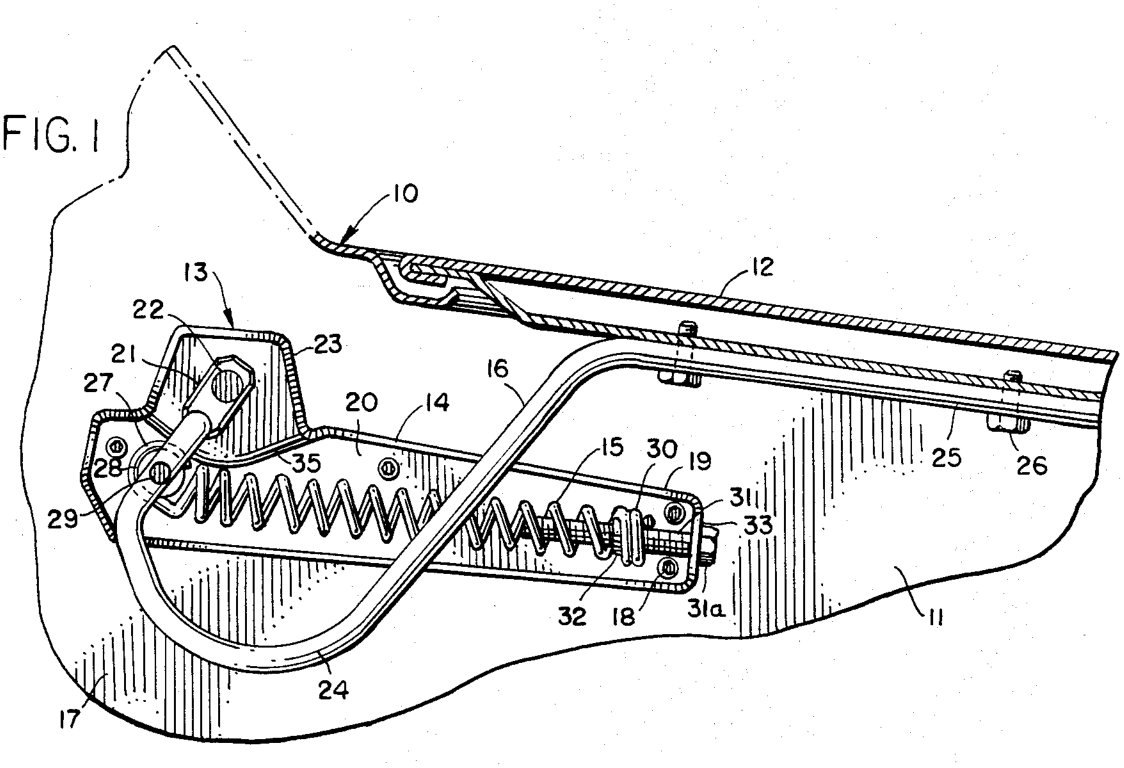
FIG. 1 is a fragmentary longitudinal vertical sectional view through the rear portion of an automotive vehicle illustrating one of the trunk lid hinge assemblies embodying the present invention, the trunk lid being illustrated in fully closed position.

Referring to FIGS. 1–7, the numeral 10 generally designates an automotive vehicle having a trunk compartment 11 accessible through an opening normally closed by lid 12. Within the compartment on each side of the vehicle is a hinge assembly 13. Only one of the assemblies is shown; the other is of the same construction and operation except that it is a mirror image of the assembly depicted in FIG. 1.

Each hinge assembly 13 includes a mounting member or plate 14, a coil tension spring 15, and a connecting arm 16. The plate 14 may be stamped from sheet metal and is secured to side wall 17 of the vehicle by screws 18 or by any other suitable means. A flange 19 extends about the periphery of the plate 14 to reinforce that plate and also to define a cavity 20 that at least partially receives coil spring 15.

The trunk lid connecting arm 16 has a first end portion 21 pivotally connected by pivot pin 22 (preferably in the form of a rivet) to upstanding portion 23 of the mounting plate 14. The arm also includes a curved intermediate portion 24 and a second end portion 25 secured by screws 26 or other appropriate attachment means to the underside of trunk lid 12.

Figure 2:
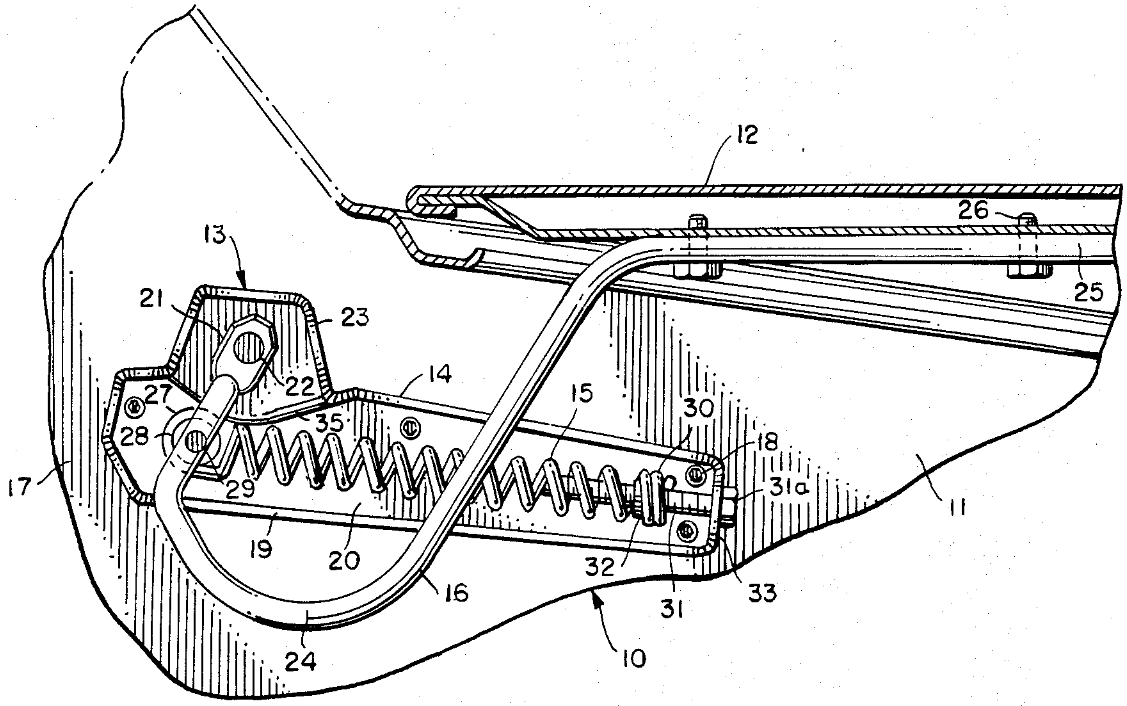
FIG. 2 is a sectional view similar to FIG. 1 but showing the trunk lid in a partially raised position.

As shown in the drawings, arm 16 pivots about a horizontal pivot axis as the lid swings from a fully closed position (FIG. 1) into a partially opened position FIG. 2) and, finally, into a fully opened position (FIG.

3). While a range of angular movement may vary depending on the design of the vehicle, the angular distance between fully opened and fully closed positions should generally fall within the range of about 45° to 65°. A range of approximately 55° is shown in the drawings.

Figure 4:
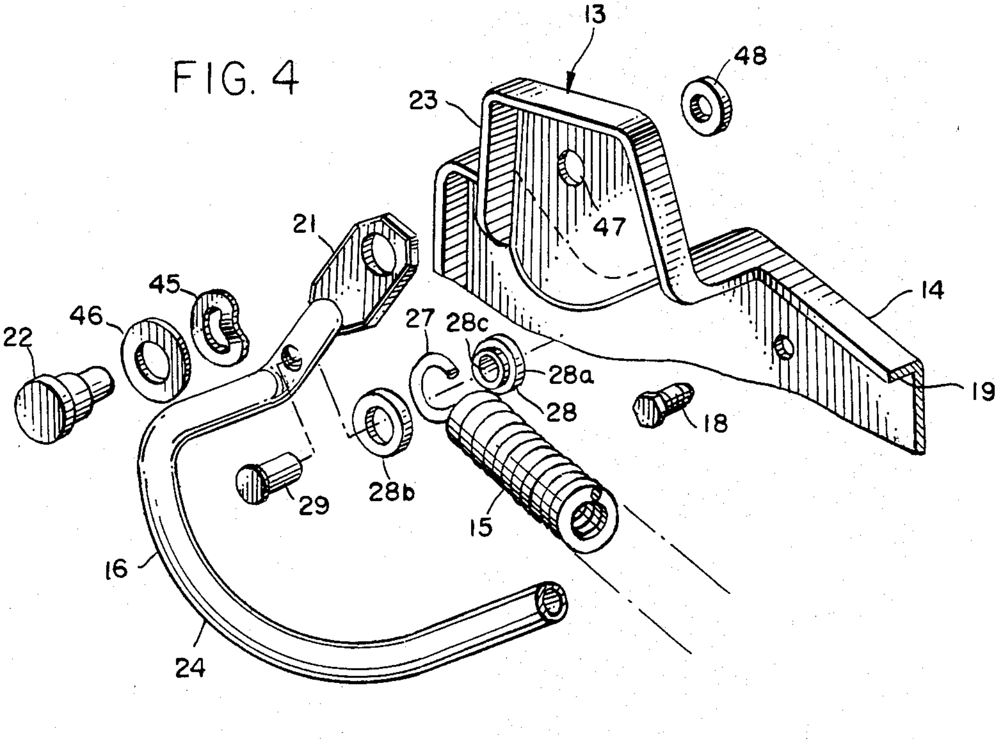
FIG. 4 is a fragmentary exploded perspective view illustrating components of the hinge assembly.

The helical tension spring 15 has a hook 27 at one end that extends about a roller or sheave 28 rotatably carried by mounting pin 29. In FIG. 4, the roller is shown to be composed of two parts or sections 28*a* and 28*b* with section 28*b* taking the form of a washer that fits over the reduced cylindrical portion of section 28*a*, and with section 28*a* having a bore 28*c* therethrough for rotatably receiving the shank of pin 29. The roller is retained on the pin by swaging the end of the pin or by any other appropriate means.

Figure 3:
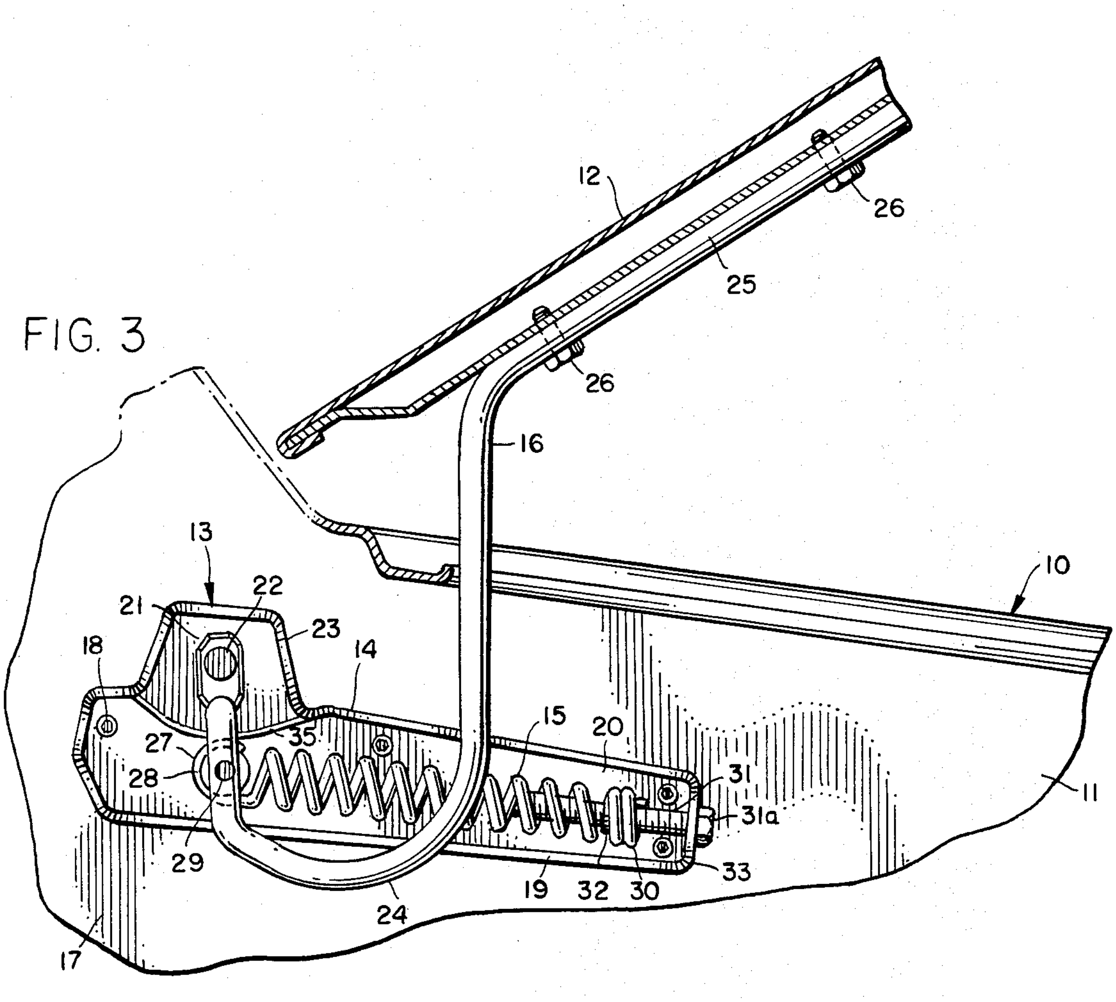
FIG. 3 is a similar sectional view showing the lid in fully raised position.

The opposite end 30 of the spring is connected to the mounting plate 14 at a remote point so that the spring is stretched to a greater or lesser extent depending on whether the trunk lid is closed or opened. The spring is under maximum tension when the lid is closed (FIG. 1) and under a minimum preload tension when the lid is fully raised (FIG. 3). It will be noted that when the lid is in its lowered position, it is generally horizontal and its center of gravity is displaced horizontally from hinge pin 22 to a maximum extent. Therefore, the proportion of its weight not supported directly by pin 22 is also at a maximum. As the lid swings upwardly, the proportion of such unsupported weight (i.e., the weight not directly supported by pin 22 is gradually diminished, reaching a minimum value when the trunk lid is fully raised (FIG. 3). In that position, the center of gravity of the trunk lid is disposed above hinge pin 22 and has reached its closest horizontal distance to the axis of that hinge. Although the force exerted by spring 15 diminishes as the lid is raised, the spring force needed to counterbalance the unsupported weight of the lid also diminishes as the lid is raised. It has been found that by selecting springs of the proper size and strength, and by adjusting the tension of such springs, a pair of assemblies of the type generally shown in the drawings may effectively counterbalance a trunk lid so that it will remain in any selected open position between the partially open position of FIG. 2 and the fully open position of FIG. 3. Alternatively, by slightly increasing the tension of the springs, the compensating force may be increased to the point that the lid will slowly raise without interruption into fully open position when unlatched and released.

Adjustment of the tension of spring 15 is achieved by rotating head 31*a* of threaded draw bar or bolt 31. The threaded shank of the bolt is received by an internal nut 32 secured by welding or by any other suitable means within the coils of the end portion 30 of the spring. Reference may be had to co-owned U.S. Pat. No. 4,529,179 (the disclosure of which is included by reference herein) for details of the construction of such internal nut and its relationship with bolt 31 and spring 15. The shank of the bolt passes through an opening in end wall 33 of plate 14, and the head 31*a* engages the end wall to hold the bolt against longitudinal movement in response to spring tension.

When the spring 15 is in the stretched condition depicted in FIG. 2, it has almost reached a condition of maximum extension. Ideally, the condition is a stable one to the extent that the force exerted by the spring is just sufficient to offset or equal the unsupported weight of the trunk lid. If left undisturbed, the lid would remain in the position shown in FIG. 2 or, as already explained, the draw bar 31 might be adjusted to slightly increase the tension of the spring and cause the lid to shift slowly upwardly from the position shown in the drawing. In any case, the force exerted by the spring when the lid is in the position of FIG. 2 is one half of the total force needed to compensate or slightly overcompensate for the otherwise unsupported weight of the lid 12, it being kept in mind that assembly 13 is one of two substantially identical assemblies used to support and counterbalance the lid.

Figure 5:
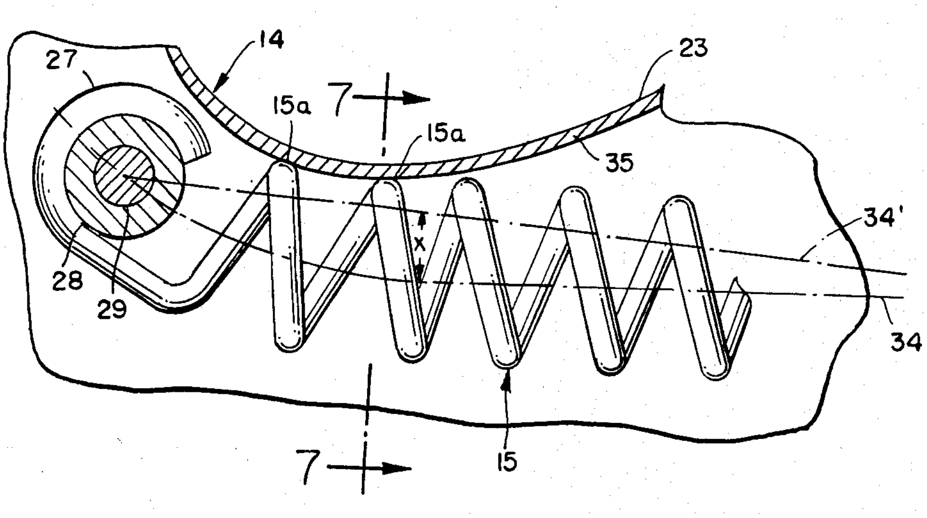
FIG. 5 is an enlarged fragmentary longitudinal sectional view illustrating the lateral deflection of the spring when the lid is fully closed as indicated in FIG. 1.
Figure 6:
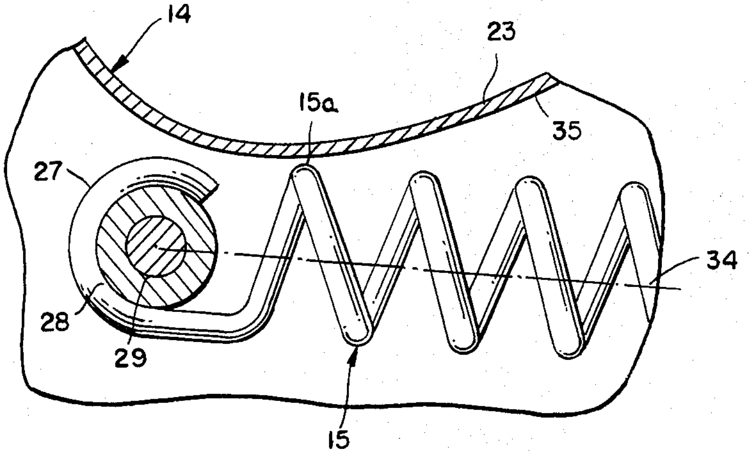
FIG. 6 is an enlarged fragmentary sectional view similar to FIG. 5 but showing the condition of the spring when the lid is partially raised as in FIG. 2.
Figure 7:
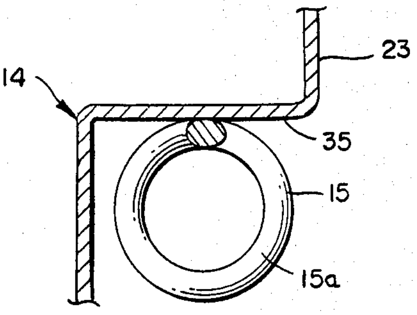
FIG. 7 is an enlarged vertical sectional view taken along line 7—7 of FIG. 5.

Referring to FIGS. 6 and 2, it will be observed that when the lid is in its partially-open position, or in any position of greater opening (to and including the fully opened position of FIG. 3), the spring is in a linear condition. Phantom line 34 in FIG. 6, which represents the longitudinal axis of the coil spring, is a straight line revealing that all of the coils of the spring are in coaxial alignment. Although the coils of the spring adjacent hook 27 are in close proximity to the undersurface 35 of the mounting plate's upstanding portion 23, or may even contact that undersurface, no lateral (downward) deflection or distortion of the spring has occurred. However, as the lid is urged downwardly from the position of FIGS. 2, 6, pin 29 and roller 28 carry the hook end of the spring in an upwardly sweeping path. The result is that at least one of the coils 15*a* adjacent hook 27 is shifted upwardly into engagement with the curved undersurface 35 (FIGS. 5, 7, 1). If it were not for the spring abutting and deflecting surface portion 35, the longitudinal axis of the spring would simply be displaced upwardly but would remain linear, as indicated by line 34' in FIG. 5. However, the undersurface prevents retention of such linearity, instead producing a lateral deflection or distortion of the spring resulting in a curvature of its longitudinal axis as indicated by line 34. In effect, the hook end of the spring is wrapped to a limited extent about the curved spring-deflecting surface 35. In addition to the imposed curvature, the spring must extend longitudinally to accommodate the lateral deflection "x" imposed by camming surface 35. The result is that the rate of tensioning of the spring 15 is markedly increased over the limited arc of travel between the partially closed position of the lid (FIGS. 2, 6) and the lid's fully closed position (FIGS. 1, 5, 7). Conversely, the force exerted by the spring over that limited arc of travel is substantially greater than needed to counterbalance the weight of the trunk lid. A fully closed lid, when unlatched and unrestrained by external forces, will therefore swing upwardly into the partially open position of FIGS. 2 and 6 to relieve the lateral distortion imposed on the spring, at which point the spring again assumes a linear condition. The deflection or distortion of the spring as the trunk lid approaches fully closed position therefore provides the added tensioning required to cause the lid to pop open a limited extent when unlatched. In terms of angular distance, the limited arc of such movement would normally be 15° or less, preferably about 10°. A 10° arc of movement for a trunk lid of a typical vehicle of standard size is equivalent to an opening distance of about 2 to 4 inches. A user may therefore easily insert his/her fingers beneath the rear flange or panel of the trunk lid, even when wearing gloves or mittens, for the purpose of swinging the lid into fully opened position. Also, such distance is sufficient to make it readily apparent to anyone viewing the vehicle that the lid is in its unlatched and partially-open condition.

Figure 8:
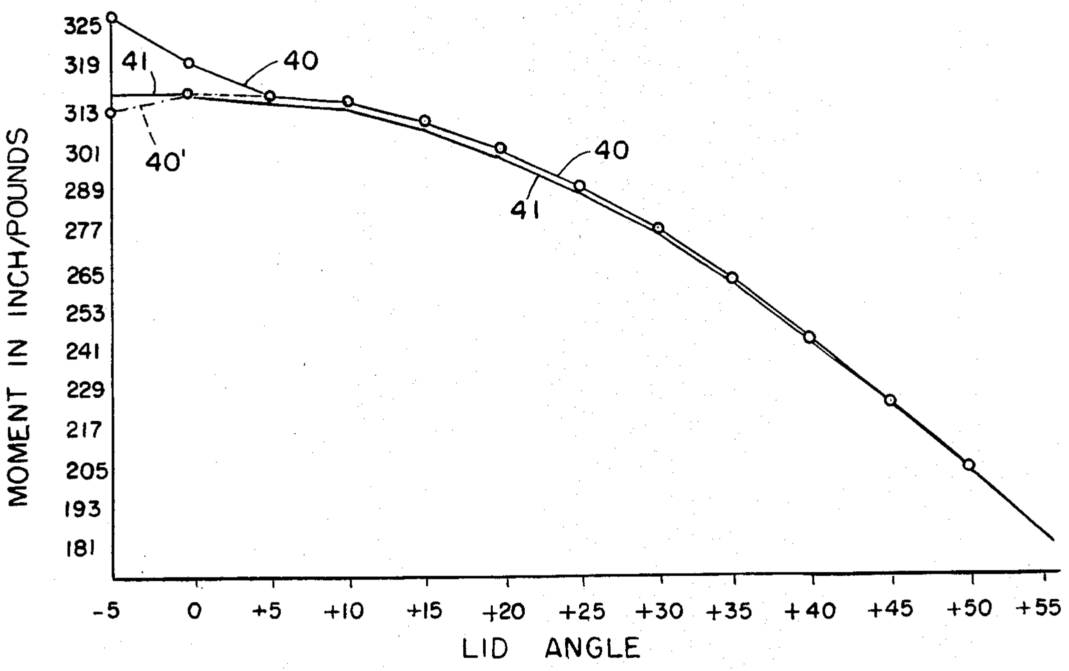
FIG. 8 is a graph comparing the moment of force exerted by gravity on a trunk lid with the opposing force exerted by a counterbalancing spring assembly embodying this invention.

FIG. 8 is a graph comparing the moments of force exerted by gravity on a sample trunk lid, and the moments of force exerted by the coil springs of a pair of spring assemblies, when the lid is at incremental angular distances ranging between minus 5° from the horizontal (a downwardly-sloping fully closed position) to plus 55° from the horizontal (a fully opened or raised position). The partially-opened position represented in FIGS. 2 and 6 occurs at approximately plus 5°.

Between open positions of plus 5° to plus 55°, the force exerted by the springs 15 remains within 3% of the force required for counterbalancing the weight of the lid. Such a close match means that the springs, when so adjusted, will hold the lid in any selected angular position between partially open and fully open positions in the absence of any externally applied forces. It will be observed, however, that line 40, representing the moment in inch/pounds exerted by the springs, diverges from line 41, representing the moment of force exerted by gravity on the lid, for angular positions of the lid less than plus 5°. Thus, as the lid is closed beyond the partially-open position depicted in FIGS. 2 and 6, the force exerted by the laterally-deflected spring increases substantially beyond that required to offset the force of gravity. For comparison purposes the phantom line 40′ extending between angular positions of plus 5° to minus 5° indicates the force that would be exerted by springs 15 if longitudinal extension continued but lateral deflection did not occur—that is, if the camming surfaces 35 of the mou ting plates 14 were omitted but all other elements remained as disclosed.

It is to be understood that while the graph of FIG. 8 illustrates what may be considered proper spring adjustment for usual operating conditions, the draw bolts 31 may be tightened to increase spring tension so that line 40 is spaced sufficiently above line 41 over the range of angular positions from plus 5° to plus 55° to overcompensate for the force of gravity. The result is that when unlatched, the trunk lid will immediately pop open to its partially raised position (plus 5°) and will then continue to lift slowly without interruption into its fully raised position. Since the heads 31a of the draw bolts 31 are readily accessible within the trunk compartment, such adjustment to suit the needs and preferences of users may be easily made by the manufacturer, dealer, serviceman, or user. Thus, a user wishing to add a luggage rack or bicycle rack to a trunk lid may readily adjust the tension of the springs to provide the desired counterbalancing effect. Upon removal of such items, the spring tension may again be readjusted to retain effective counterbalancing of the lid.

Some frictional resistance to pivotal movement of the lid is believed desirable so that, for example, gusts of wind do not cause an open trunk lid to swing downwardly, possibly injuring a user in the process of loading or unloading the trunk compartment. In general, a resistance of between 5 to 15 pounds, preferably about 10 pounds, is believed sufficient for that purpose. Such resistance may be readily provided by fitting a conventional spring wave washer 45 about the shank of hinge pin or rivet 22, and between washer 46 and the apertured end 21 of arm 16. The pin extends through aperture 47 and mounting plate 13, and then through end washer 48. Retention of the hinge pin 22 is achieved by swagging the end portion of the pin protruding beyond washer 48, although it is believed apparent that other means of retention might be provided.

Figure 9:
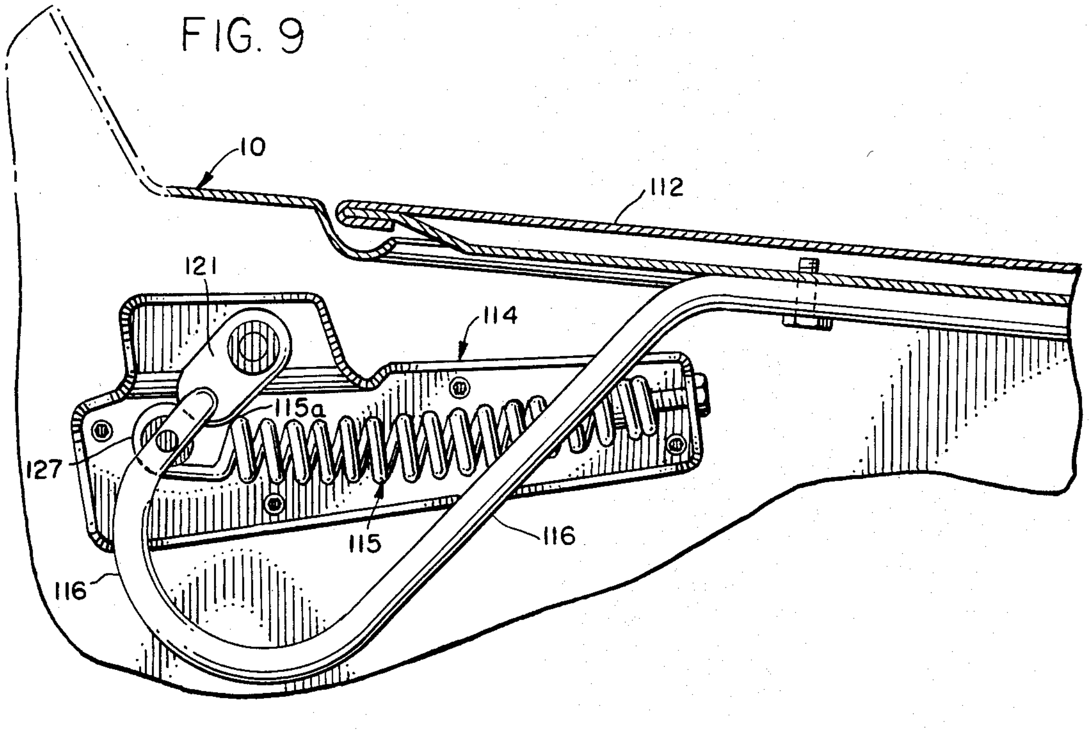
FIG. 9 is a fragmentary longitudinal vertical sectional view through the rear portion of an automotive vehicle illustrating a trunk lid hinge assembly constituting a second embodiment of this invention.

The embodiment of FIG. 9 is similar to the one already described except that the lateral deflection of spring 115 occurs not because of contact between the spring and a deflecting surface of mounting plate 114 but because coil 115a immediately adjacent hook portion 127 engages the enlarged end portion 121 of arm 116. When the lid 112 is in its partially-open position (corresponding to the position depicted in FIG. 2), or in any position of greater opening, the spring 115 is in a linear condition. However, as the lid is pivoted from its partially-open position into its fully closed position (FIG. 9), the spring-abutting surface of the end portion 121 of the arm deflects the spring downwardly to force its longitudinal axis into a downwardly-curved arcuate shape. The non-linear deflection of the spring substantially increases its tension so that for the limited arc of travel between a partially-closed (or partially-open) position and the fully-closed position of FIG. 9, the spring tension is substantially greater than needed to counterbalance the weight of the trunk lid. In other structural and functional respects, the embodiment of FIG. 9 is substantially the same as that of FIGS. 1–7.

While in the foregoing, embodiments of the invention have been disclosed in detail for purposes of illustration, it will be understood by those skilled in the art that many of these details may be varied without departing from the spirit and scope of the invention.

I claim:

1. A hinge and spring assembly for the trunk lid of an automotive vehicle, comprising a mounting plate adapted to be secured to a body wall of a vehicle; a trunk lid connecting arm having a first end portion pivotally mounted upon said plate for movement of said arm between a lowered position and a fully raised position; said arm having a second end portion adapted to be fixed to the underside of a trunk lid for movement of said lid between closed and open positions as said arm pivots between its lowered and fully raised positions; a tension coil spring having one end connected to said arm at a point adjacent said first end portion and having its opposite end connected to said plate so that said spring is maintained in a longitudinally stretched and tensioned condition to exert a lifting force for offsetting the weight of a trunk lid connected to said arm; and means mounted upon said plate for engaging at least one coil of said spring for laterally deflecting and distorting said spring to increase its lifting force over a limited arc of pivotal movement of said arm between said lowered position and an intermediate partially-raised position, thereby urging a trunk lid into a partially-opened condition when unlatched.

2. The assembly of claim 1 in which said coil spring is oriented relative to said plate and arm to exert a lifting force equal to at least one half of the force needed to counterbalance the unsupported weight of a trunk lid connected to said arm at all angular positions of said arm between lowered and fully raised positions.

3. The assembly of claim 2 in which said opposite end of said spring is adjustably connected to said plate for varying the length of said spring and thereby adjusting its tension.

4. The assembly of claim 1 in which friction means is provided at the pivotal mounting of said first end portion of said connecting arm and said plate for providing a selected amount of resistance to pivotal movement of said arm between said lowered and raised positions.

5. The assembly of claims 1, 2, 3, or 4 in which said coil-engaging means comprises an abutment portion of said plate for laterally engaging said spring only during said limited arc of movement of said arm for causing non-linear deflection and substantially increased tension of said spring.

6. The assembly of claim 5 in which said abutment portion deflects said spring downwardly to force its longitudinal axis into a downwardly-curved configuration upon said lateral engagement between said abutment portion and said spring.

7. The assembly of claims 1, 2, 3, or 4 in which said coil-engaging means comprises an abutment portion of said first end portion of said arm for laterally engaging said spring only during said limited arc of movement of said arm for causing non-linear deflection and substantially increased tension of said spring.

8. The assembly of claim 7 in which said abutment portion deflects said spring downwardly to force its longitudinal axis into a downwardly-curved configuration upon said lateral engagement between said abutment portion and said spring.

9. An automotive vehicle having a body, a trunk compartment and opening therefor, and a lid for closing said trunk opening; a pair of mounting plates secured to opposite sides of said vehicle within said trunk compartment; said trunk lid being provided with a pair of connecting arms each having a first end portion hingedly mounted upon one of said plates for movement of said arm between a lowered position and a fully raised position; each of said arms having a second end portion fixed to the underside of said trunk lid for movement of said lid between closed and open positions as said arms pivot between their lowered and fully raised positions; and a pair of tension coil springs each having one end connected to one of said arms at a point adjacent said first end portion thereof and having its opposite end connecting to one of said plates so that springs are maintained in longitudinally stretched and tensioned condition to exert a lifting force for offsetting the weight of a trunk lid connected to said arms; and means mounted upon each of said plates for engaging at least one coil of each of said springs for laterally deflecting and distorting said springs and for substantially increasing their lifting force over a limited arc of pivotal movement of said lid between said closed position and a partially-opened position, thereby urging said lid into its partially-opened position when unlatched.

10. The vehicle of claim 9 in which said coil springs are oriented relative to said plates and arms to exert a lifting force at least equal to the force needed to counterbalance the unsupported weight of said lid at all angular positions of said lid between closed and open positions.

11. The vehicle of claim 10 in which said opposite end of each of said springs is adjustably connected to one of said plates for varying the length of said spring and thereby adjusting its tension.

12. The vehicle of claim 9 in which friction means is provided at the pivotal mounting of said first end portion of each of said connecting arms and each of said plates for providing a selected amount of resistance to movement of said lid between open and closed positions.

13. The vehicle of claims 9, 10, 11, or 12 in which said coil-engaging means for increasing said lifting force comprises an abutment portion provided by each of said plates for laterally engaging each of said springs only during said limited arc of movement of said arms for causing non-linear deflection and increased tension of said springs.

14. The vehicle of claim 13 in which said abutment portions deflect said springs downwardly to force their longitudinal axes into downwardly-curved configurations upon said lateral engagement between said abutment portions and said springs.

15. The vehicle of claims 9, 10, 11, or 12 in which said coil-engaging means for increasing said lifting force comprises abutment portions of said first end portions of said arms for laterally engaging said springs only during said limited arc of movement of said arms for causing non-linear deflection and increased tension of said springs.

16. The vehicle of claim 15 in which said abutment portions deflect said springs downwardly to force their longitudinal axes into downwardly-curved configurations upon lateral engagement between said abutment portions and said springs.

* * * * *